F. A. PREUSS.
CORN CULTIVATOR.
APPLICATION FILED AUG. 23, 1910.
993,403.
Patented May 30, 1911.
2 SHEETS—SHEET 2.
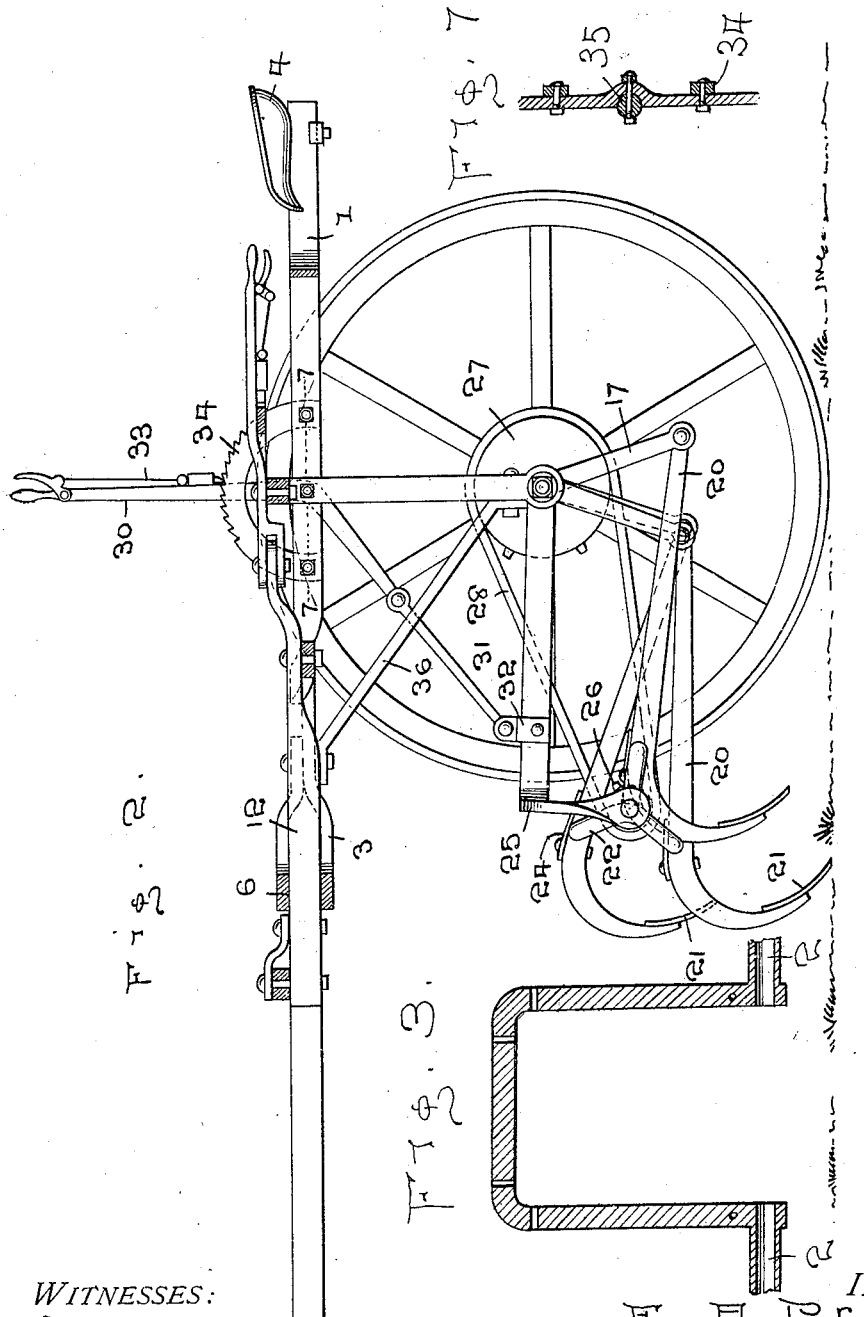
WITNESSES:
INVENTOR
F. A. Preuss
BY
W. J. Fitzgerald & Co.
Attorneys

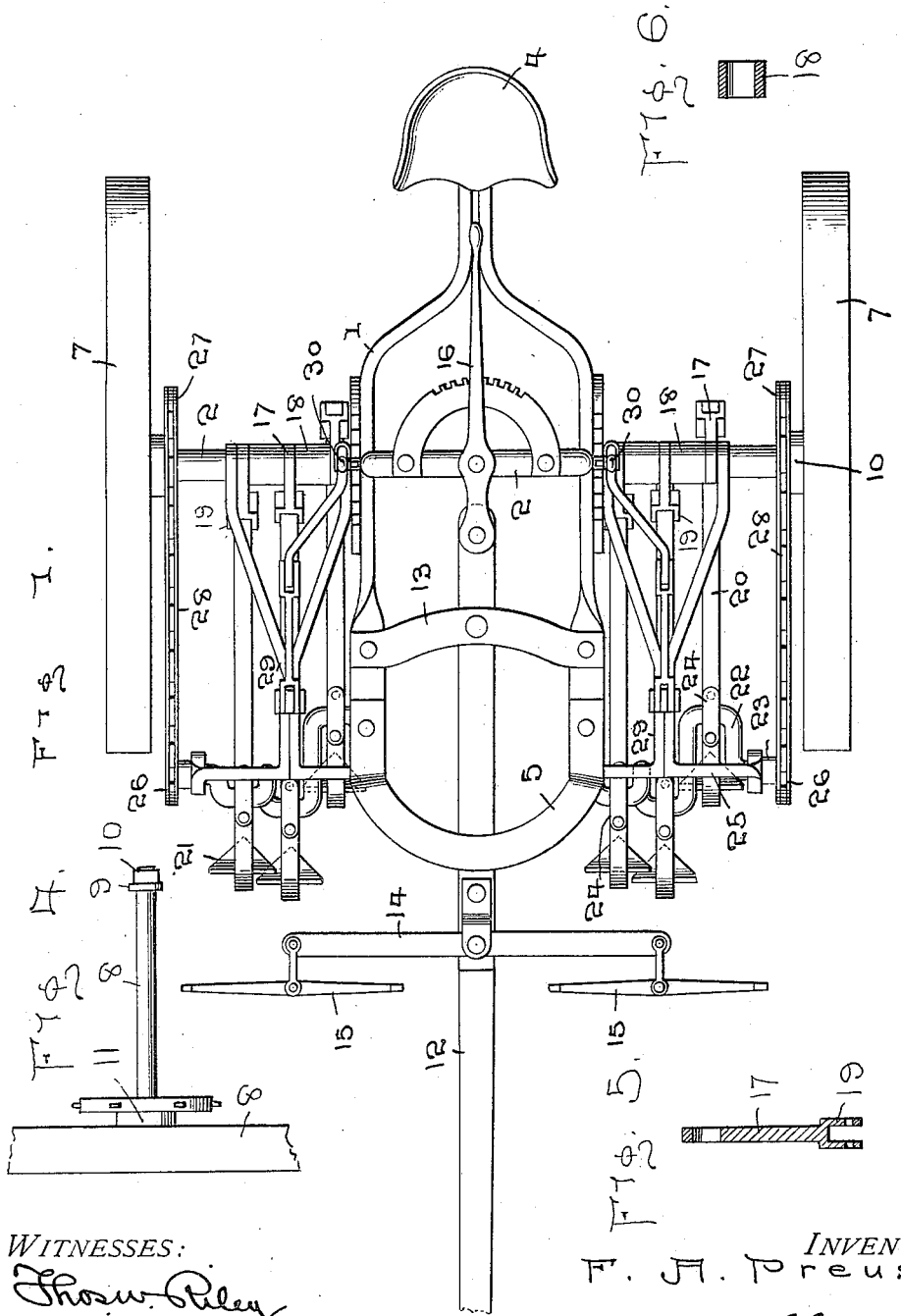

UNITED STATES PATENT OFFICE.

FREDERICK A. PREUSS, OF GREEN GARDEN PRECINCT, MADISON COUNTY, NEBRASKA.

CORN-CULTIVATOR.

993,403.　　　　　　Specification of Letters Patent.　　Patented May 30, 1911.

Application filed August 23, 1910. Serial No. 578,533.

*To all whom it may concern:*

Be it known that I, FREDERICK A. PREUSS, a citizen of the United States, residing at Green Garden precinct, in the county of Madison and State of Nebraska, have invented certain new and useful Improvements in Corn-Cultivators; and I do hereby declare the following to be a full, clear, and exact description of the invention, such as will enable others skilled in the art to which it appertains to make and use the same.

My invention relates to new and useful improvements in cultivators, and more particularly to corn cultivators, and my object is to provide a cultivator having a plurality of spading or shoveling implements which have communication with a plurality of cranks, thereby bringing the spades or shovels successively into engagement with the ground.

A further object is to so arrange the cultivator shovels so that when the same successively engage the soil, it will not be thrown any appreciable distance.

A further object is to provide a draft tongue and guiding means therefor.

A further object is to provide a plow of the class described, which shall have superior advantages in point of simplicity, durability and general efficiency.

Other objects and advantages will be hereinafter referred to, and more particularly pointed out in the specification and claim.

In the accompanying drawings forming part of this application, Figure 1 is a top plan view of the device. Fig. 2 is a longitudinal section thereof. Fig. 3 is a detail sectional view of the arched axle portions thereof being broken away. Fig. 4 is a detail elevation of one of the wheels and spindles therefor. Fig. 5 is a section of an arm connecting the axle with the cultivator beam. Fig. 6 is a section of one of the collars between said arms. Fig. 7 is a detail section as seen on line 7—7, Fig. 2.

Referring to the drawings in which similar reference characters designate corresponding parts throughout the several views, 1 is a main cultivator frame mounted upon the usual form of arched axle 2, said frame being twisted in its length just forward of said axle, and drop forged, as at 3. The ends of said frame 1 are brought together in the rear of said axle 2, and have mounted thereon the seat 4, while the forward end or drop forged portion 3 is designed arcuately, and has mounted thereon a plate 5, said plate being also arcuately designed in alinement with the portion 3 of the frame. Said portion of the frame and the plate 5 are separated throughout the greater part of their length, whereby a slot 6 is provided between said plate 5 and the end of said frame. Mounted on the ends of the axle 2, which horizontal portions are tubular, are the wheels 7, said wheels being provided with spindles 8, which extend through the tubular portions of said axle, a collar 9 and nut 10 at one end of said spindle, and a collar 11 at the other end thereof, retaining said wheels in proper position on said axle. I have shown and prefer the same to be driven by horse. A draft tongue 12 is inserted in the slot 6 and fulcrumed on a brace bar 13 extending transversely of said frame 1, and I have provided a bar 14 mounted on said draft tongue 12, to which is secured the whiffletrees 15, and to aid in the turning and the guiding of the machine, I have provided a guide lever 16 fulcrumed to the arch of said axle 2, the inner end thereof being pivoted to the inner end of said draft tongue 12, whereby the driver in the seat 4 may conveniently manipulate the same for obvious purposes. Loosely mounted on the axle 2, on both sides of the frame 1, is a plurality of arms 17, said arms being spaced apart through the medium of collars 18, and to the bifurcated ends 19 of said arms, is pivoted one end of the cultivator beams 20, the opposite ends of said beams being curved and carrying the cultivators or shovels 21.

The beams 20 are mounted in their lengths to the cranks 22 of the crank shafts 23 through the medium of the removable bearing boxes 24 secured to said beams 20. The shafts 23 are in turn mounted in a yoke 25 and extend beyond the arms thereof, the outer ends of said shafts being provided with sprockets 26 which have connection with the sprockets 27 on the spindles 8, through the medium of chains 28, whereby it will be seen that as the wheels 7 are driven forwardly, power will be applied to the crank shaft 23 and the shafts on the cultivator beams successively engaged with the soil, in view of the plurality of cranks.

The yokes 25 are formed of two pieces of metal, brought together to form a substantially U-shaped member, and the extensions 29 thereof bent at right angles to the said form of yoke, and extended rearwardly to form a substantially Y-shaped member, and having the ends thereof mounted upon the horizontal portions of the axle 2, said Y-shaped extensions forming a substantial yoke and a means for retaining the arms 17 and the collars 18 in position on said axle.

It is not desired however, to have the cultivator shovels in operation continually, or designed to chop a greater or lesser amount of soil all the time, so that I have provided means for the raising and lowering thereof, comprising levers 30 pivotally mounted to the frame 1, to the lower end of which is pivoted a link 31, the opposite end of said link being pivotally engaged with a clip 32 mounted upon the extension 29 of the yoke 25, whereby it will be seen that as said lever is thrown forwardly or rearwardly, the yoke and the corresponding shoveling implements will be respectively raised or lowered, and to provide for the retaining in desired position of said shoveling implements, I have provided latches 33 on the levers 30 which are adapted to engage the arcuately designed ratchets 34, carried by the frame 1. It will be seen therefore, that the shoveling implements may be wholly raised from effective position, or may be lowered or raised to accordingly cultivate, more or less, of the soil at each stroke of the cultivator beam.

As stated before, the frame 1 is mounted upon the arched axle 2, but it must be stated that said frame is provided with grooves 35 to receive the round portions of said arched axle and thereby form bracing means at such points, and to further brace the frame, brace bars 36 extend upwardly from the lower portion of the said arched axle to the said frame, so that a strong and durable machine will be provided to withstand the rough treatment in the fields.

It will be seen that I have provided a cultivator which will allow the shovels thereof to successively engage the soil, thereby giving a chopping action thereto. It will further be seen that I have so arranged the cultivator shovels as not to allow the soil cultivator to be thrown any appreciable distance, and not allow the ridging thereof. It will further be understood that the machine will clear itself of all weeds and trash, owing to the upward and downward movement of the cultivator implements.

What I claim is:

In a cultivator, an arched axle having end sleeves, driving wheels having spindles mounted on the sleeves of the arched axle, a frame secured to the axle, forwardly extending yokes mounted on the sleeves, said yokes being provided with laterally extending forward end portions having depending twisted members, cranked axles mounted on the yokes, crank arms on the sleeves, cultivator implements pivoted at their rear ends to the crank arms and journaled on the cranked axles, a two part link device connected with each yoke, means for operating the device, and means for rotating the cranked axles.

In testimony whereof I have signed my name to this specification in the presence of two subscribing witnesses.

FREDERICK A. PREUSS.

Witnesses:
 HERBERT BUELTNER,
 AMY BUELTNER.

---

Copies of this patent may be obtained for five cents each, by addressing the "Commissioner of Patents, Washington, D. C."